United States Patent
Huang et al.

(10) Patent No.: US 10,998,954 B2
(45) Date of Patent: May 4, 2021

(54) METHODS AND DEVICES FOR PROCESSING A DATA SIGNAL FOR TRANSMISSION TO MULTI-STREAM TERMINALS

(71) Applicant: Apple Inc., Cupertino, CA (US)

(72) Inventors: Min Huang, Beijing (CN); Feng Yang, Beijing (CN); Xu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/494,474

(22) PCT Filed: Apr. 7, 2017

(86) PCT No.: PCT/CN2017/079732
§ 371 (c)(1),
(2) Date: Sep. 16, 2019

(87) PCT Pub. No.: WO2018/184211
PCT Pub. Date: Oct. 11, 2018

(65) Prior Publication Data
US 2020/0091986 A1  Mar. 19, 2020

(51) Int. Cl.
*H04B 7/06* (2006.01)
*H04B 7/0452* (2017.01)
*H04B 7/0456* (2017.01)

(52) U.S. Cl.
CPC ......... *H04B 7/0634* (2013.01); *H04B 7/0452* (2013.01); *H04B 7/0456* (2013.01); *H04B 7/0623* (2013.01)

(58) Field of Classification Search
CPC .. H04B 7/0452; H04B 7/0456; H04B 7/0623; H04B 7/0626; H04B 7/0634
See application file for complete search history.

(56) References Cited

U.S. PATENT DOCUMENTS

2004/0087308 A1  5/2004  Tirkkonen et al.
2011/0080961 A1*  4/2011  Hui ..................... H04L 25/0204
                                                375/259

(Continued)

FOREIGN PATENT DOCUMENTS

CN       103368702 A    10/2013
CN       103442366 A    12/2013

OTHER PUBLICATIONS

Kai-Kit Wong, R. D. Murch and K. B. Letaief, "Ajoint-channel diagonalization for multiuser MIMO antenna systems," in IEEE Transactions on Wireless Communications, vol. 2, No. 4, pp. 773-786, Jul. 2003, doi: 10.1109/TWC.2003.814347. (Year: 2003).*

(Continued)

*Primary Examiner* — Gary Mui
(74) *Attorney, Agent, or Firm* — Eschweiler & Potashnik, LLC

(57) ABSTRACT

The disclosure relates to a radio transceiver, comprising: a precoder configured to precode a data signal for transmission to a plurality of multi-stream terminals based on a plurality of precoding weight matrices; and a processor configured to generate for each terminal in an iterative manner a precoding weight matrix and a transformed channel matrix, wherein the transformed channel matrix indicates a channel gain between the radio transceiver and the respective terminal transformed by a receive filter matrix of the respective terminal, wherein the generation of the precoding weight matrix and the transformed channel matrix in a current iteration is based on the transformed channel matrix generated from a previous iteration.

21 Claims, 13 Drawing Sheets

(56) References Cited

U.S. PATENT DOCUMENTS

| | | | | |
|---|---|---|---|---|
| 2013/0058433 A1* | 3/2013 | Na | ..................... | H04B 7/0456 |
| | | | | 375/296 |
| 2013/0182788 A1* | 7/2013 | Amara | ................. | H04B 7/0426 |
| | | | | 375/267 |
| 2013/0272445 A1 | 10/2013 | Shen et al. | | |
| 2015/0036599 A1* | 2/2015 | Kim | ..................... | H04L 5/0073 |
| | | | | 370/329 |
| 2015/0215009 A1* | 7/2015 | Jia | ..................... | H04B 7/0456 |
| | | | | 375/267 |
| 2019/0089427 A1* | 3/2019 | Chang | ................. | H04B 7/0617 |

OTHER PUBLICATIONS

Q. H. Spencer, A. L. Swindlehurst and M. Haardt, "Zero-forcing methods for downlink spatial multiplexing in multiuser MIMO channels," in IEEE Transactions on Signal Processing, vol. 52, No. 2, pp. 461-471, Feb. 2004, doi: 10.1109/TSP.2003.821107. (Year: 2004).*

L. Tran, M. Bengtsson and B. Ottersten, "Iterative Precoder Design and User Scheduling for Block-Diagonalized Systems," in IEEE Transactions on Signal Processing, vol. 60, No. 7, pp. 3726-3739, Jul. 2012, doi: 10.1109/TSP.2012.2192433. (Year: 2012).*

Pan, Zhengang et al. "Generalized Multiuser Orthogonal Space-Division Multiplexing." IEEE Transactions on Wireless Communications, vol. 3, No. 6, Nov. 2004.

China Patent Office, PCT International Search report issued for PCT/CN2017079732, 3 pgs., dated Dec. 28, 2017.

\* cited by examiner

METHODS AND DEVICES FOR PROCESSING A DATA SIGNAL FOR TRANSMISSION TO MULTI-STREAM TERMINALS

FIELD

The disclosure relates to methods and devices for processing a data signal for transmission to a plurality of multi-stream terminals. In particular, the disclosure relates to a method and a system of multi-user precoding for Massive MIMO with Multi-Stream terminals.

BACKGROUND

In future cellular networks (like 4.5G, 5G and onward), the application of massive MIMO (Multiple Input Multiple Output) technology, which is characterized by the utilization of a large number of antennas and transceivers can greatly increase system capacity, extend cell coverage and reduce interference level. As shown in FIG. 1, the downlink signals 111, 112, 121, 122 from base station (BS) 130 are sent to multiple users 110, 120 by dedicated beamforming with spatial multiplexing, which is called MU-MIMO (Multi-User MIMO).

Due to a growing number of users of such networks 100, there is a need to further increase the spectrum efficiency and system throughput.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
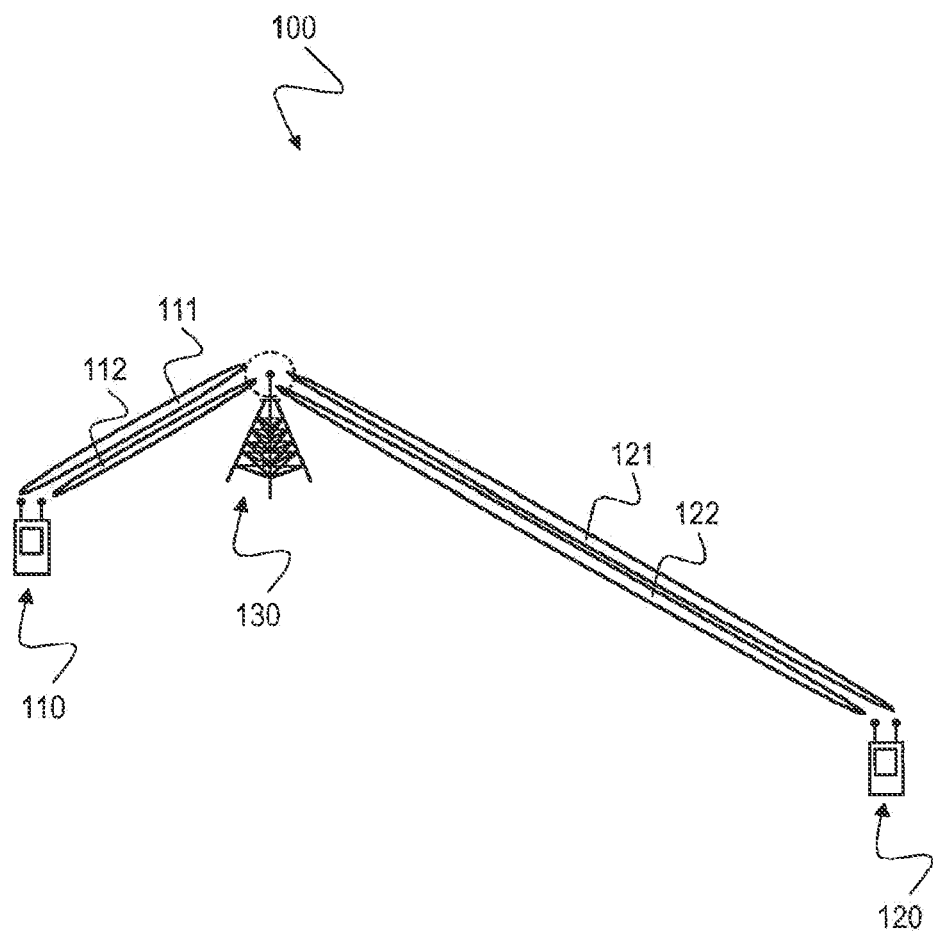
FIG. 1 is a schematic diagram illustrating a Multi-User (MU)-MIMO communication system 100.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure.

The following detailed description, therefore, is not to be taken in a limiting sense, and the scope of the present disclosure is defined by the appended claims.

It should be noted that the terminology "beam" in this disclosure may particularly refer to the analog beam direction instead of the "eigenbeam" obtained by the digital beamforming technique.

The following terms, abbreviations and notations will be used herein:
3GPP: 3rd Generation Partnership Project,
LTE: Long Term Evolution,
RF: Radio Frequency,
UE: User Equipment or mobile station or terminal,
eNodeB: base station,
MIMO: Multiple Input Multiple Output,
MU-MIMO: Multi-User MIMO.

The methods and devices described herein may be based on radio transceivers and radio transceiver circuits in network nodes such as eNBs, base stations, relay stations and mobile stations. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular 4.5G, 5G and beyond. The methods and devices described below may be implemented in network nodes and base stations. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein may be configured to transmit and/or receive millimeter wave (mmW) signals. Millimeter waves are radio waves in the electromagnetic spectrum from about 30 GHz to about 300 GHz. Radio frequencies in this band have wavelengths from about ten to one millimeter, giving it the name millimeter band or millimeter wave.

The methods and devices described herein after may be designed in accordance to mobile communication standards such as e.g. the Long Term Evolution (LTE) standard or the advanced version LTE-A thereof. LTE (Long Term Evolution), marketed as 4G LTE and 5G LTE, is a standard for wireless communication of high-speed data for mobile phones and data terminals.

The methods and devices described hereinafter may be applied in OFDM systems. OFDM is a scheme for encoding data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency resources. A diversity receiver uses two or more antennas to improve the quality and reliability of a wireless link.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
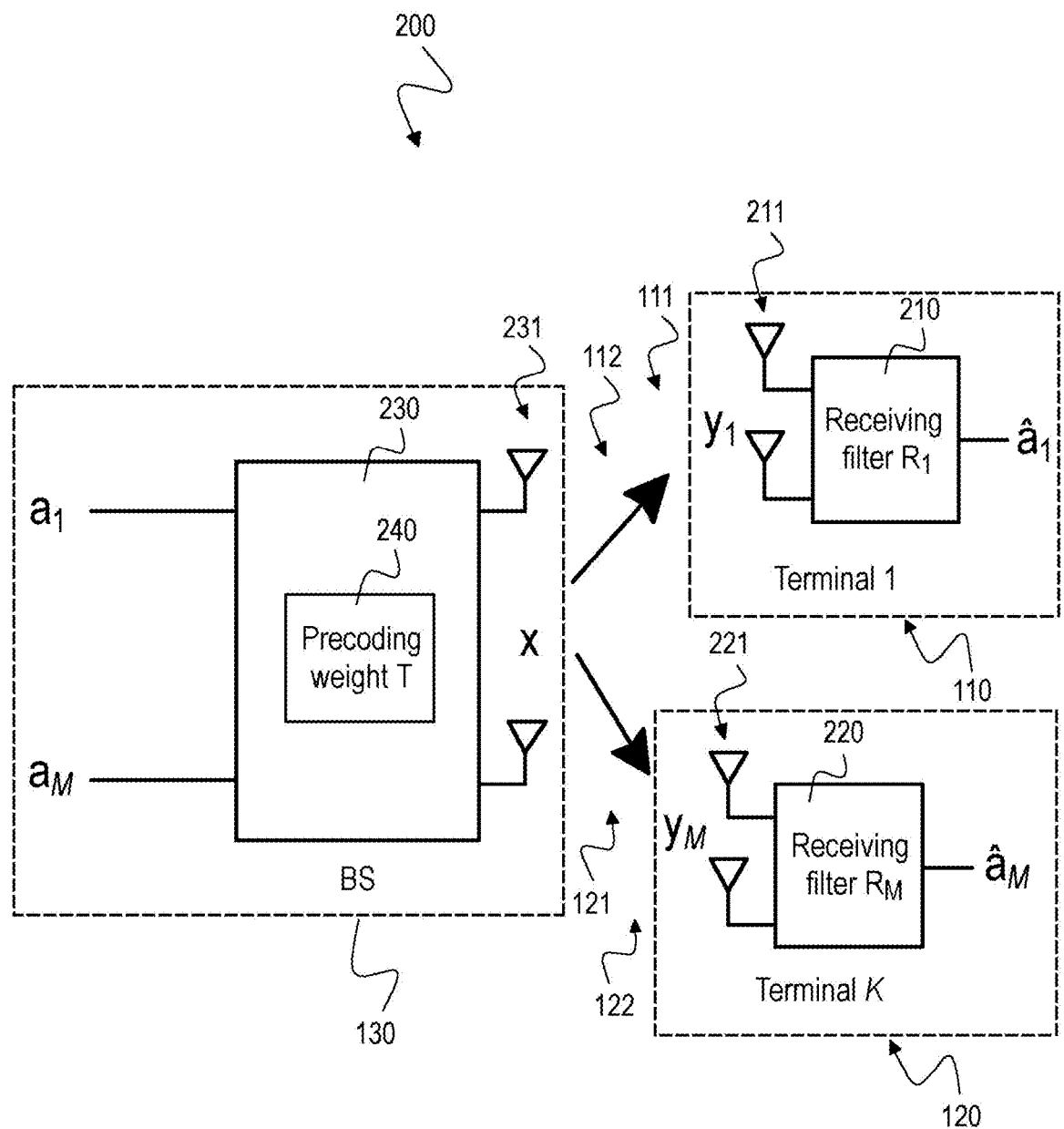
FIG. 2 is a block diagram illustrating a MU-MIMO communication system 200 with multi-stream terminals.

FIG. 2 is a block diagram illustrating a MU-MIMO communication system 200 with a base station transceiver 130 and multi-stream terminals 110, 120, e.g. user equipments (UEs). The BS transceiver 130 includes a precoding weight T, 240 for precoding a data signal $a_1, \ldots, a_M$ to generate a dedicated beamformed data signal x. The beamformed data signal x is transmitted by multiple antenna ports 231 to a plurality of multi stream terminals 110, 120. Each of these terminals 110, 120 includes multiple antenna ports 211, 221 for receiving a corresponding multi-stream data signal, e.g. the downlink signals 111, 112 corresponding to first and second antenna beams for Terminal 1, 110 and the downlink signals 121, 122 corresponding to first and second antenna beams for Terminal K, 120. FIG. 2 depicts an exemplary number of K terminals 110, 120. K can be any integer number, for example 1, 2, 3, 4, 5, etc. The number of antenna ports 231 for the base station transceiver 130 can be any integer number and also the number of antenna ports 211, 221 for each terminal 110, 120 can be any integer number. Different terminals 110, 120 can have the same number or a different number of antenna ports 211, 221. The BS transceiver 130 thus implements dedicated beamforming with spatial multiplexing, i.e. MU-MIMO transmission.

The BS transceiver 130 generates a dedicated beam by precoding weight vector/matrix for the UE 110, 120. There are different solutions for implementing the BS transceiver 130. One approach is to assign a channel state information (CSI)-reference signal (RS) to the common beams or dedicated beams. Then the UE can measure these reference signals and report the index of beams or their codebook that most fit itself downlink channel. However, due to restricted number of reference signals, restricted size of codebook and limited UL feedback bandwidth, eNB can only obtain partial information about channel response matrix. The other approach is to configure the UE to send sounding reference signal (SRS), and then make the eNB estimate the uplink channel matrix and apply it in downlink according to downlink-uplink channel reciprocity. This method can obtain the full intra-cell channel information, except inter-cell co-channel interference.

Because the multiple users cannot make joint receiving processing in downlink transfer, the inter-user interference should be thoroughly mitigated by transmitting processing at the BS transceiver 130. This requires high accuracy of channel response matrix, which can be provided by the above-mentioned solution based on uplink SRS.

Since the terminals 110, 120 that join MU-MIMO transfer require high channel signal-noise-ratio (SNR), they normally locate at the cell center. Thus, the interference from neighbor cells to them are normally very weak and the precoding weight generation only from current cell CSI is mostly sufficient.

When each terminal 110, 120 has only one receiving antenna, it can at most have one spatial stream, so its precoding matrix generation only needs to consider the mitigation of inter-user interference from other terminals. In this case, normally the solution based on per-stream minimum mean squared error (MMSE) precoding weight matrix is adopted. But when each terminal 110, 120 is equipped with multiple receiving antenna ports 211, 221, the precoding matrix generation may need to additionally consider intra-user parallel multi-stream transfer, but such per-stream MMSE method is unable to utilize joint multi-stream receiving processing and thus suffers from capacity loss.

A second approach is based on channel matrix block-diagonalization (BD), which may be referred to as "per-user zero-forcing (ZF) method". Specifically, it tries to maximize intra-user capacity by utilizing joint multi-stream receiving processing while forcing the inter-user interference to zero. Since there is no closed-form solution of such multi-parameter optimization problem, an iterative solution is provided in this approach. However, it can be shown in theory and in simulation (see FIGS. 8a, 8b, 8c) that such method does not control the latter iteration's operation within a restricted scope provided by former iteration, it fails to guarantee the iteration convergence.

A third approach is based on per-user MMSE criterion and per-stream MMSE criterion, which is also an iterative processing due to lack of closed-form solution. Though it is proved to be convergent, it can only get to local optimum but it cannot be guaranteed to reach the global optimum (see FIGS. 9a, 9b, 9c below). Another severe issue that impacts its practicality is its long convergence process which may need tens of iteration steps. This would greatly increase the computation complexity.

To overcome the shortage of the above-mentioned solutions, a new iterative per-user ZF method is disclosed hereinafter which is based on the subspace inheritance between the two consecutive successive iterations, so that the convergence of processing iterations can strictly hold. Hence, the capacity of multi-user massive-MIMO system can be improved, and such gain is increased with the number of per-user receiving antennas.

In the following a radio transceiver implementing this new iterative per-user ZF method that is based on the subspace inheritance is described. The radio transceiver can be implemented as a base station radio transceiver 130 as shown in FIG. 200. However, the radio transceiver can also be implemented in any radio cell, e.g. for a sidelink in a device-to-device (D2D) communication scenario. In the following, the radio transceiver is described with respect to FIG. 2 as a BS radio transceiver 130.

The radio transceiver 130 includes a precoder 240 and a processor 230. The precoder 240 may be integrated with the processor 230 or may be a separate processing unit. The precoder 240 is configured to precode a data signal $a_1, \ldots, a_M$ for transmission to a plurality of multi-stream terminals 110, 120 based on a plurality of precoding weight matrices $T_k$. The processor 230 is configured to generate for each terminal 110, 120 in an iterative manner a precoding weight matrix $T_k$ and a transformed channel matrix. The transformed channel matrix indicates a channel gain between the radio transceiver 130 and the respective terminal 110, 120 transformed by a receive filter matrix $R_1$ 210, $R_M$ 220 of the respective terminal 110, 120. I.e., Terminal 1, 110 includes receive filter matrix $R_1$ 210, Terminal K, 120 includes receive filter matrix $R_M$ 220, and further terminals not depicted in FIG. 2 include further receive filter matrices. The generation of the precoding weight matrix and the transformed channel matrix in a current iteration is based on the transformed channel matrix generated from a previous iteration, e.g. as described below with respect to FIGS. 3 to 7 in more detail.

The processor 230 may be configured to generate the transformed channel matrix based on subspace inheritance between two successive iterations. The processor 230 may be configured to determine the transformed channel matrix of a respective terminal 110, 120 in the current iteration based on the receive filter matrices 210, 220 of the respective terminal 110, 120 from all previous iterations, e.g. as described below with respect to FIGS. 3 to 7.

The processor 230 may be configured to restrict a signal subspace of the transformed channel matrix in the current iteration within the signal subspace of the transformed channel matrix from the previous iterations. The processor 230 may be configured to generate the precoding weight matrix and the transformed channel matrix for a number of iterations until a stopping criterion is fulfilled, e.g. as described below with respect to FIGS. 3 to 7. The stopping criterion may be fulfilled if a number of parallel streams whose transmit power is non-zero for each terminal is convergent. For example, the stopping criterion may be fulfilled after a number of two or three iterations.

The radio transceiver 130 may include a receiver to receive feedback from the plurality of terminals 110, 120. The feedback may include information about the channel gains. The processor 230 may be configured to initialize the receive filter matrix 210, 220 of the respective terminal 110, 120 in a first iteration to a predetermined matrix, e.g. as described below with respect to FIGS. 3 to 7.

The processor 230 may be configured to generate the transformed channel matrix in the first iteration based on a natural channel matrix, i.e. a matrix having entries which include raw channel gains between the radio transceiver 130 and the respective terminal 110, 120 without any transmitting signal processing or receiving signal processing, e.g. as described below with respect to FIGS. 3 to 7. The raw channel matrix may include the channel gains between the antenna ports 231 of the radio transceiver 130 and the antenna ports 211, 221 of the corresponding terminals 110, 120.

The processor 230 may be configured to generate a composite co-channel matrix for a specific terminal, e.g. Terminal 1, 110 in the current iteration based on combining the transformed channel matrices of all other terminals from the previous iteration, e.g. as described below with respect to FIGS. 3 to 7. The processor 230 may be configured to determine null subspace dimensions of the composite co-channel matrix, e.g. as described below with respect to FIGS. 3 to 7. The processor 230 may be configured to project the transformed channel matrix of the specific terminal 110 onto the null subspace dimensions of the composite co-channel matrix to generate a post-projection transformed channel matrix, e.g. as described below with respect to FIGS. 3 to 7.

The processor 230 may be configured to generate singular values and singular vectors of the post-projection transformed channel matrix, e.g. as described below with respect to FIGS. 3 to 7. The processor 230 may be configured to generate the receive filter matrix 210 of the specific terminal 110 based on dominant singular values and singular vectors of the post-projection transformed channel matrix, e.g. as described below with respect to FIGS. 3 to 7. The processor 230 may be configured to allocate a transmit power for the specific terminal 110 onto a number of parallel streams which correspond to signal subspace directions which is spanned by the singular vectors of the post-projection transformed channel matrix, e.g. as described below with respect to FIGS. 3 to 7.

The processor 230 may be configured to remove rows in the receive filter matrix 210 of the specific terminal 110 which correspond to the streams whose allocated transmit powers are zero, e.g. as described below with respect to FIGS. 3 to 7. The processor 230 may be configured to update the precoding weight matrix in the current iteration based on the null subspace dimensions of the composite co-channel matrix from the previous iteration, e.g. as described below with respect to FIGS. 3 to 7. The processor 230 may be configured to update the transformed channel matrix in the current iteration based on a combination of the receive filter matrix 210, 220 in the current iteration with the transformed channel matrix from the previous iteration, e.g. as described below with respect to FIGS. 3 to 7.

Figure 3:
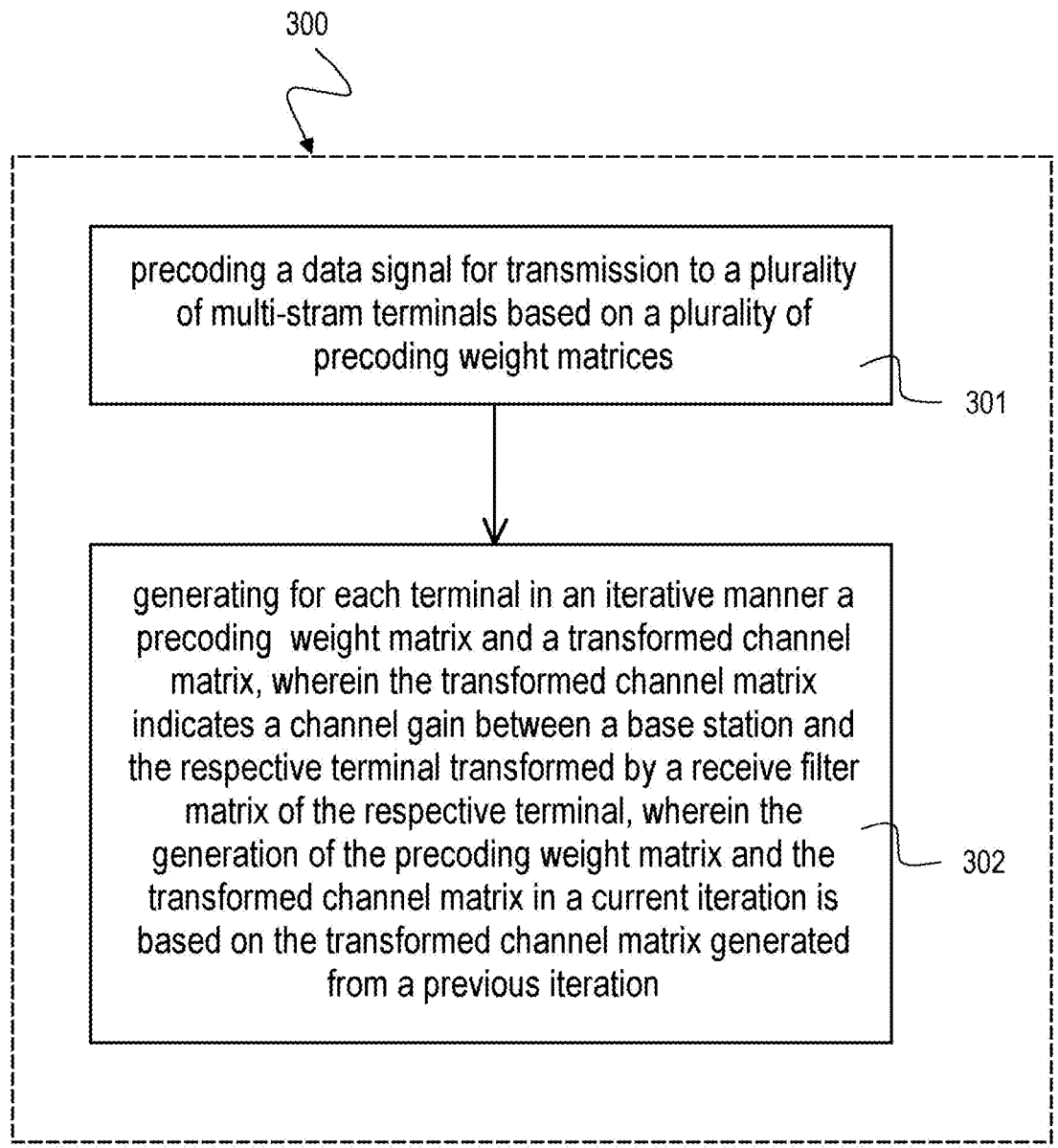
FIG. 3 is a schematic diagram illustrating an exemplary method 300 for processing a data signal for transmission to a plurality of multi-stream terminals.

FIG. 3 is a schematic diagram illustrating an exemplary method 300 for processing a data signal for transmission to a plurality of multi-stream terminals.

The method 300 includes precoding 301 a data signal, e.g. a data signal $a_1, \ldots, a_M$ as described above with respect to FIG. 2, for transmission to a plurality of multi-stream terminals, e.g. multi-stream terminals 110, 120 as described above with respect to FIG. 2, based on a plurality of precoding weight matrices. The precoding 301 may be performed by a precoder 240 as described above with respect to FIG. 2.

The method 300 further includes generating 302 for each terminal 110, 120 in an iterative manner a precoding weight matrix and a transformed channel matrix, wherein the transformed channel matrix indicates a channel gain between a base station, e.g. a base station including the radio transceiver 130 as described above with respect to FIG. 2, and the respective terminal 110, 120 transformed by a receive filter matrix 210, 220 of the respective terminal 110, 120. The generation of the precoding weight matrix and the transformed channel matrix in a current iteration is based on the transformed channel matrix generated from a previous iteration.

The method 300 may further include generating the transformed channel matrix based on subspace inheritance between two successive iterations, e.g. as described above with respect to FIG. 2. The method 300 may further include determining the transformed channel matrix of a respective terminal in the current iteration based on the receive filter matrices of the respective terminal from all previous iterations, e.g. as described above with respect to FIG. 2. The method 300 may further include restricting a signal subspace of the transformed channel matrix in the current iteration within the signal subspace of the transformed channel matrix from the previous iterations, e.g. as described above with respect to FIG. 2.

The method 300 may further include generating the precoding weight matrix and the transformed channel matrix for a number of iterations until a stopping criterion is fulfilled, e.g. as described above with respect to FIG. 2. The stopping criterion may be fulfilled if a number of parallel streams whose transmit power is non-zero for each terminal is convergent. The stopping criterion may be fulfilled after a number of two or three iterations.

The method 300 may further include receiving feedback from the plurality of terminals 110, 120, wherein the feedback comprises information about the channel gains. The method 300 may further include initializing the receive filter matrix 210, 220 of the respective terminal 110, 120 in a first iteration to a predetermined matrix, e.g. as described above with respect to FIG. 2 or below with respect to FIGS. 4 to 7.

The method 300 may further include generating the transformed channel matrix in the first iteration based on a natural channel matrix, wherein the entries of the natural channel matrix comprise raw channel gains between the base station and the respective terminal without any transmitting signal processing or receiving signal processing, e.g. as described above with respect to FIG. 2 or below with respect to FIGS. 4 to 7. The method 300 may further include generating a composite co-channel matrix for a specific terminal in the current iteration based on combining the transformed channel matrices of all other terminals from the previous iteration. The method 300 may further include determining null subspace dimensions of the composite co-channel matrix, e.g. as described above with respect to FIG. 2 or below with respect to FIGS. 4 to 7. The method 300 may further include projecting the transformed channel matrix of the specific terminal onto the null subspace dimensions of the composite co-channel matrix to generate a post-projection transformed channel matrix, e.g. as described above with respect to FIG. 2 or below with respect to FIGS. 4 to 7.

The method 300 may further include generating singular values and singular vectors of the post-projection transformed channel matrix. The method 300 may further include generating the receive filter matrix 210 of the specific terminal 110 based on dominant singular values and singular vectors of the post-projection transformed channel matrix, e.g. as described above with respect to FIG. 2 or below with respect to FIGS. 4 to 7. The method 300 may further include allocating a transmit power for the specific terminal onto a number of parallel streams which correspond to signal subspace directions which is spanned by the singular vectors of the post-projection transformed channel matrix, e.g. as described above with respect to FIG. 2 or below with respect to FIGS. 4 to 7.

The method 300 may further include removing rows in the receive filter matrix of the specific terminal which correspond to the streams whose allocated transmit powers are zero. The method 300 may further include updating the precoding weight matrix in the current iteration based on the null subspace dimensions of the composite co-channel matrix from the previous iteration. The method 300 may further include updating the transformed channel matrix in the current iteration based on a combination of the receive filter matrix in the current iteration with the transformed channel matrix from the previous iteration, e.g. as described above with respect to FIG. 2 or below with respect to FIGS. 4 to 7.

Figure 4:
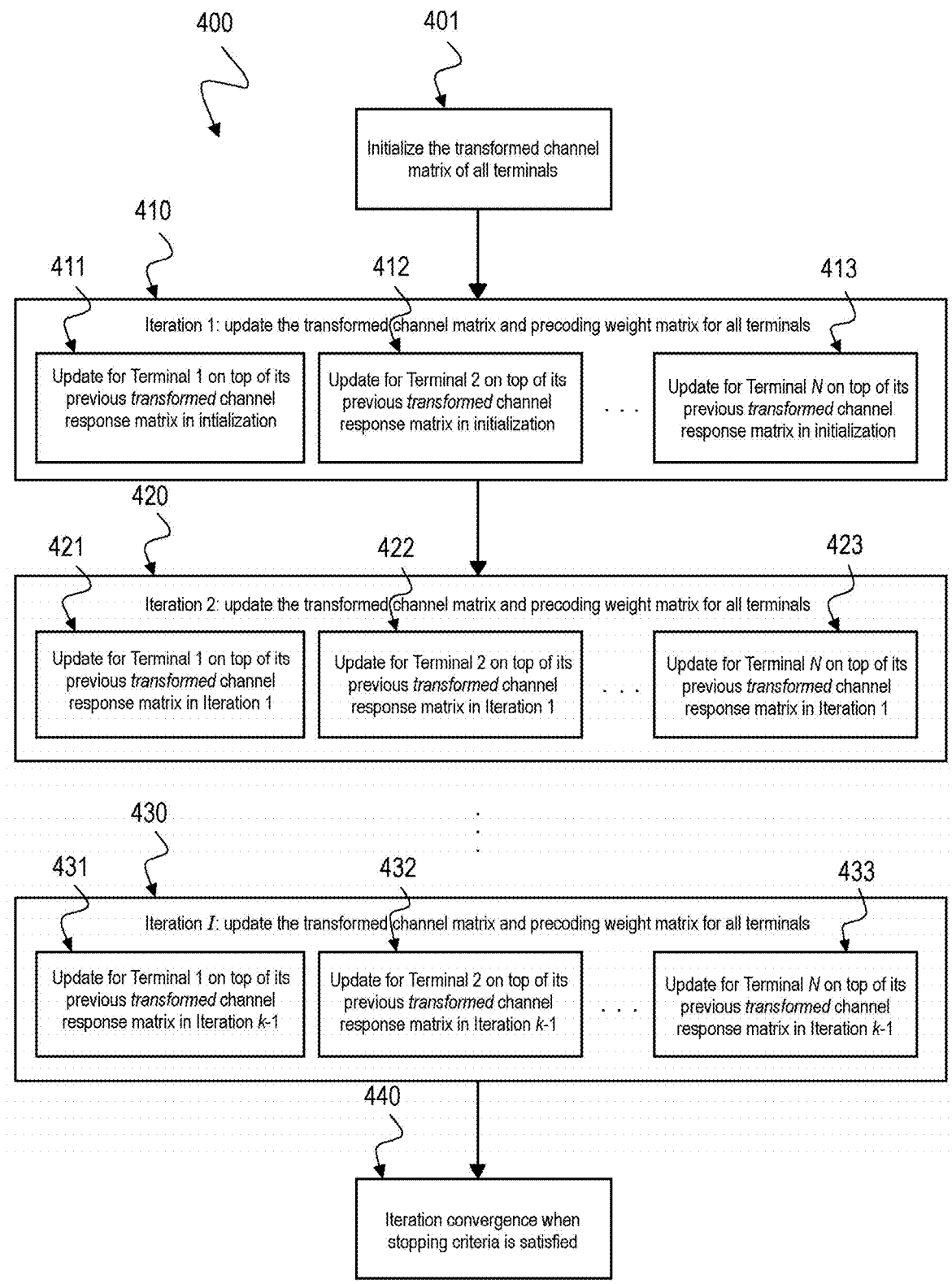
FIG. 4 is a flowchart 400 illustrating an exemplary iterative solution for processing a data signal in a MU-MIMO communication system according to the disclosure.
Figure 5:
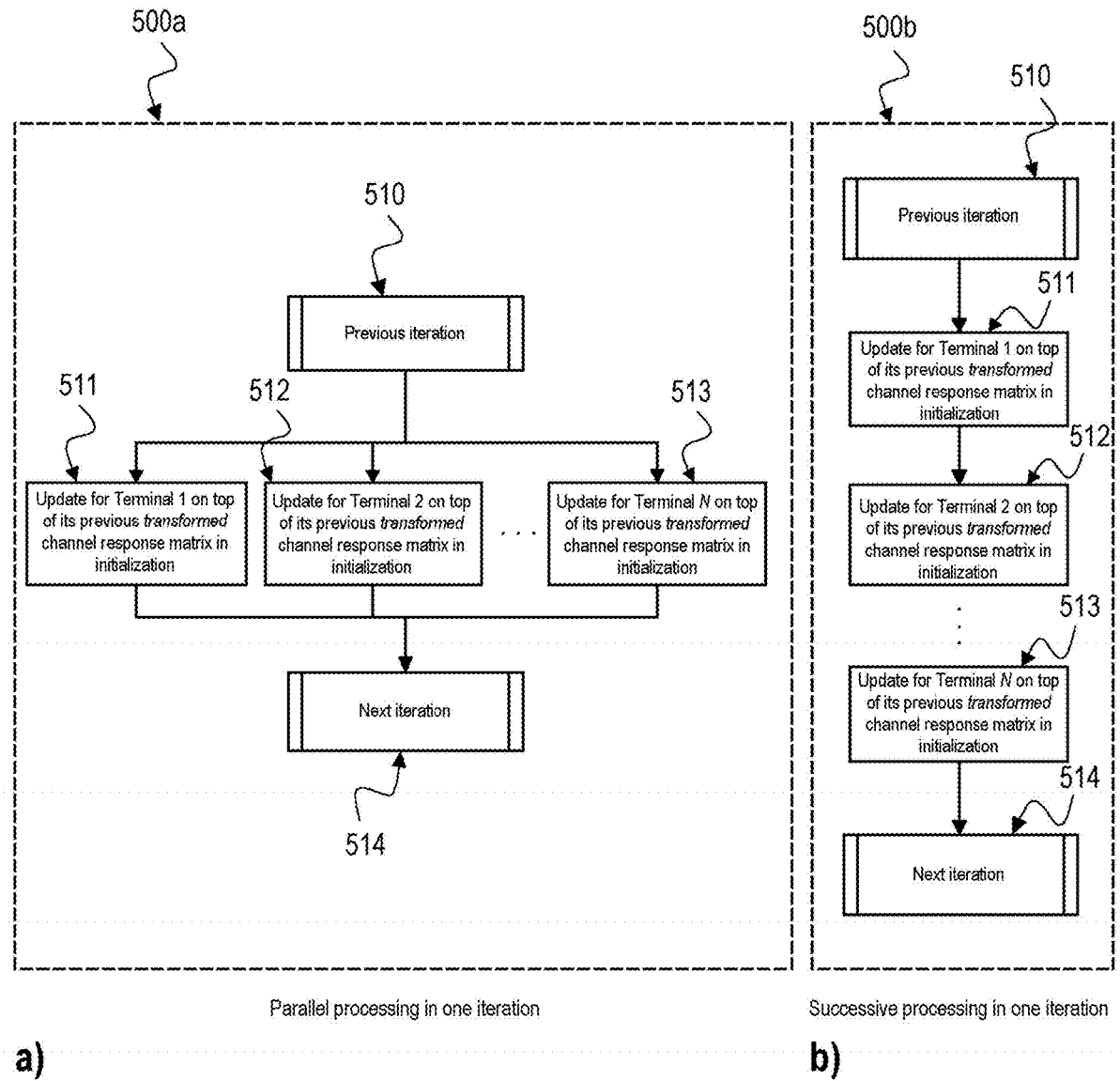
FIG. 5a is a flowchart 500a illustrating an exemplary parallel processing for each terminal in one iteration for the iterative solution according to FIG. 4.
FIG. 5b is a flowchart 500b illustrating an exemplary successive processing for each terminal in one iteration for the iterative solution according to FIG. 4.

FIG. 4 is a flowchart 400 illustrating an exemplary iterative solution for processing a data signal in a MU-MIMO communication system according to the disclosure.

The disclosed solution solves the problem of MU-MIMO transmission from one transmitting node to multiple receiving nodes simultaneously. It can be applied for example in the downlink transfer of massive-MIMO system, the interactive communication of Device-to-Device (D2D) systems (like V2X service in Internet of Vehicles), the wireless backhaul in relay systems, the wireless front-haul in Cloud-RAN systems, etc.

The disclosed solution can be applied for the transmitter, e.g. the transmitter of transceiver 130 depicted in FIG. 2, to generate the precoding weights for multi-stream receivers, e.g. receivers of terminals 110, 120 depicted in FIG. 2, when all the channel information are available at the transmitter. Without loss of generality, here the massive MIMO scenario is used as example. Then, in the following context, the multi-stream receivers can be named as terminals, e.g. terminals 110, 120 as described above with respect to FIG. 2, while the transmitter can be named as base station (BS), e.g. base station BS as shown in FIG. 2. The disclosed solution includes blocks as described in the following.

1) In the beginning, initialize 401 the incremental receiving filter matrix for each terminal, and generate the transformed channel response matrix by left-multiplying the incremental receiving filter matrix onto the natural channel matrix. Here the "natural" channel matrix denotes the matrix whose entries are the raw channel gains from the transmitting antenna to the receiving antenna without any transmitting or receiving signal processing. The "transformed" channel matrix denotes using a certain receiving processing by linear filter, so that in view of transmitter is the filtered result of the natural channel matrix.

Figure 6:
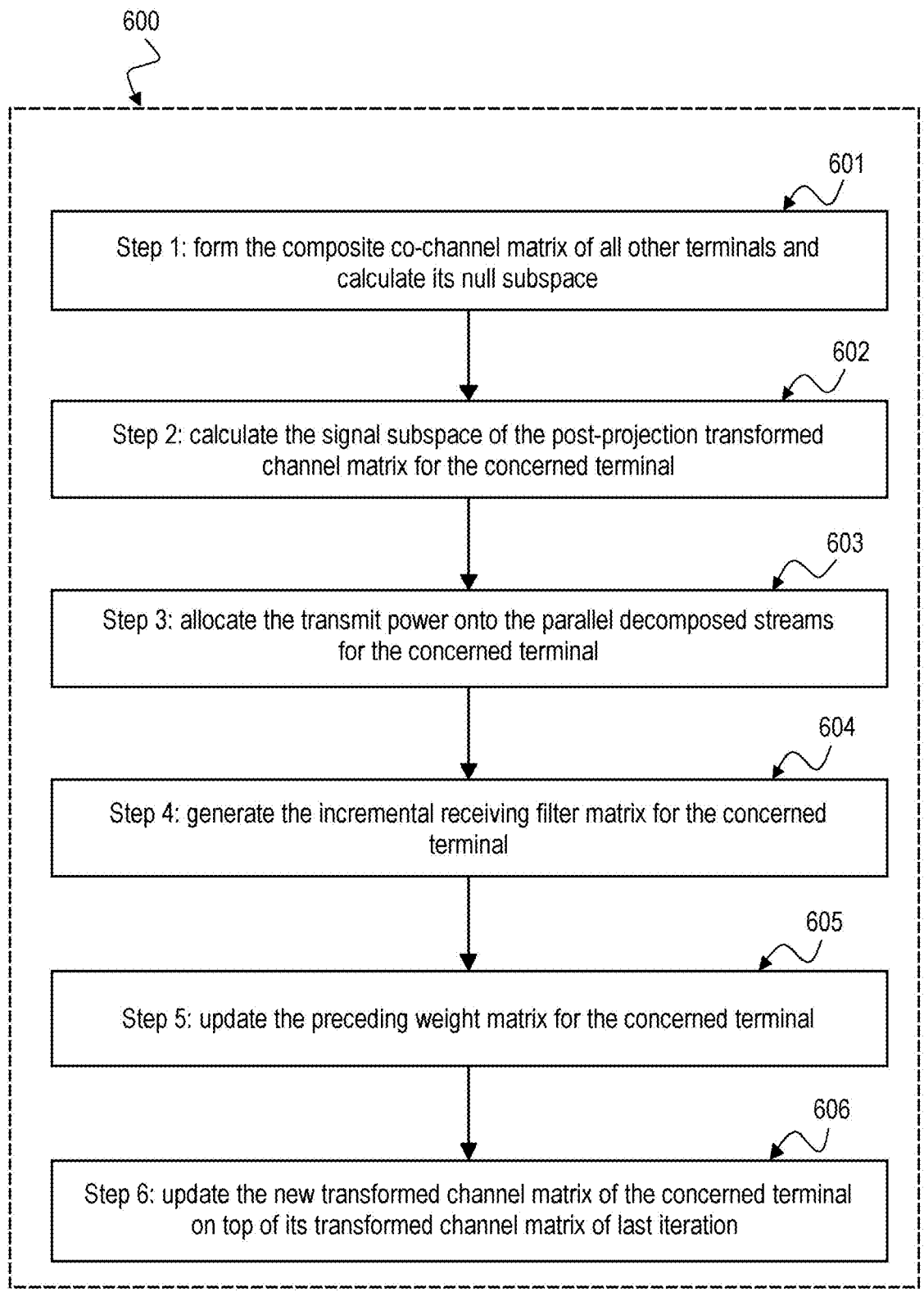
FIG. 6 is a flowchart 600 illustrating an exemplary processing for one terminal in one iteration for the iterative solution according to FIG. 4.

2) Next, iteratively generate the new incremental receiving filter matrix, and then update the transformed channel matrix for each terminal by left-multiplying the new incremental receiving filter matrix onto the previous transformed channel matrix in last iteration. The precoding weight matrix for each terminal is also generated in the process. The iterations continue until the numbers of parallel streams for each terminal are no longer changed. In FIG. 4 a first iteration 410 including updates 411, 412, 413 for each terminal, a second iteration 420 including updates 421, 422, 423 for each terminal, up to an I-th iteration 430 including updates 431, 432, 433 for each terminal are illustrated.

a) The operations of updating the transformed channel response matrices and the precoding weight matrices for one terminal (called the concerned terminal) in one iteration, i.e. each of the blocks 411, 412, 413, 421, 422, 423, 431, 432, 433 may include the steps or blocks 601, 602, 603, 604, 605, 606 as shown in FIG. 6:

Step 1, 601: combine the transformed channel matrixes of all other terminals to form the composite co-channel matrix and calculate its null subspace;

Step 2, 602: project the transformed channel matrix of the concerned terminal onto the calculated null subspace of all other terminals and calculate its post-projection signal subspace;

Step 3, 603: decompose the calculated post-projection signal subspace of the concerned terminal into a number of parallel streams and allocate the transmit power to them;

Step 4, 604: generate the incremental receiving filter matrix in accordance with the calculated post-projection signal subspace and the allocated transmit power of the concerned terminal;

Step 5, 605: update the precoding weight matrix of the concerned terminal by right-multiplying the right singular vectors of the calculated post-projected signal subspace whose allocated transmit power is non-zero onto the calculated other terminals' null subspace;

Step 6, 606: update the transformed channel matrix by left-multiplying the generated incremental receiving filter matrix onto the transformed channel matrix that is generated in last iteration.

b) The precoding weight update for all the terminals 511, 512, 513 in one iteration, i.e. between a previous iteration 510 and a next iteration 514 can be performed in parallel 500a as shown in FIG. 5a or successively 500b as shown in FIG. 5b. In FIGS. 5a and 5b the blocks 511, 512, 513 may correspond to the blocks 411, 412, 413 when considering the first iteration 410 or to the blocks 421, 422, 423 when considering the second iteration 420 or to the blocks 431, 432, 433 when considering the I-th iteration 430, where I can be any integer number.

The iterations converge when a stopping criteria is satisfied 440.

When comparing computation complexity, the disclosed subspace inheritance based solution has a higher computational complexity than the per-stream MMSE solution as described above with respect to FIG. 2, but a lower complexity than the per-user MMSE solution as described above with respect to FIG. 2. Though the same categorized as "per-user ZF" like processing, the disclosed subspace inheritance based solution is significantly distinct from the abovementioned ZF-based solution as described in the following with respect to the three aspects: A) The update of the transformed channel response matrix and precoding weight matrix in one iteration; B) The generation of receiving filter matrix; and C) The iteration stopping criterion.

A. 1) For the ZF-based solution (without subspace inheritance): Updating the transformed channel matrix of the concerned terminal in one iteration is based on its natural channel matrix, and thus the new transformed channel response matrix of the current iteration is irrelevant to the receiving filter matrixes of this terminal in any previous iteration. So the new generated signal subspace in the current iteration may not be contained by the legacy signal subspace in the previous iterations, and thus the inter-user orthogonality built by the previous iteration no longer hold in the current iteration. This would cause iteration fluctuation and be unable to make convergence to a robust and high-performance result.

A. 2) For the subspace inheritance based solution according to the disclosure: Updating the current transformed channel matrix of the concerned terminal in one iteration is based on its previous transformed channel matrix in last iteration, and thus the new transformed channel matrix of the current iteration contains the receiving filter matrixes of this terminal in all previous iterations. So the new generated signal subspace in the current iteration is strictly restricted within the legacy signal subspace in the previous iterations, and thus the inter-user orthogonality built by the previous iteration could be kept in the current iteration. This mechanism can avoid the iteration fluctuation and guarantee the absolute convergence.

B. 1) For the ZF-based solution (without subspace inheritance): Receiving filter matrix of each iteration is stand-alone. So the orthogonality along with the iteration might be broken or interrupted.

B. 2) For the subspace inheritance based solution according to the disclosure: Receiving filter matrix of all iterations are accumulated to form the convergent receiving filter matrix. This could maintain the orthogonality along with the iteration.

C. 1) For the ZF-based solution (without subspace inheritance): The iteration stopping criterion is the steadiness of the exact content of transformed channel matrix and the precoding weight matrix. The per-element comparison between two matrixes of last iteration and current iteration need considerable extra computation.

C. 2) For the subspace inheritance based solution according to the disclosure: The iteration stopping criterion is the steadiness of only the number of parallel streams for each terminal, but not the exact content of transformed channel matrix/precoding weight matrix. This stopping criterion is quite simple and requires trivial additional calculation.

More concrete derivations are given in the following detailed description with respect to FIG. 7.

Figure 7:
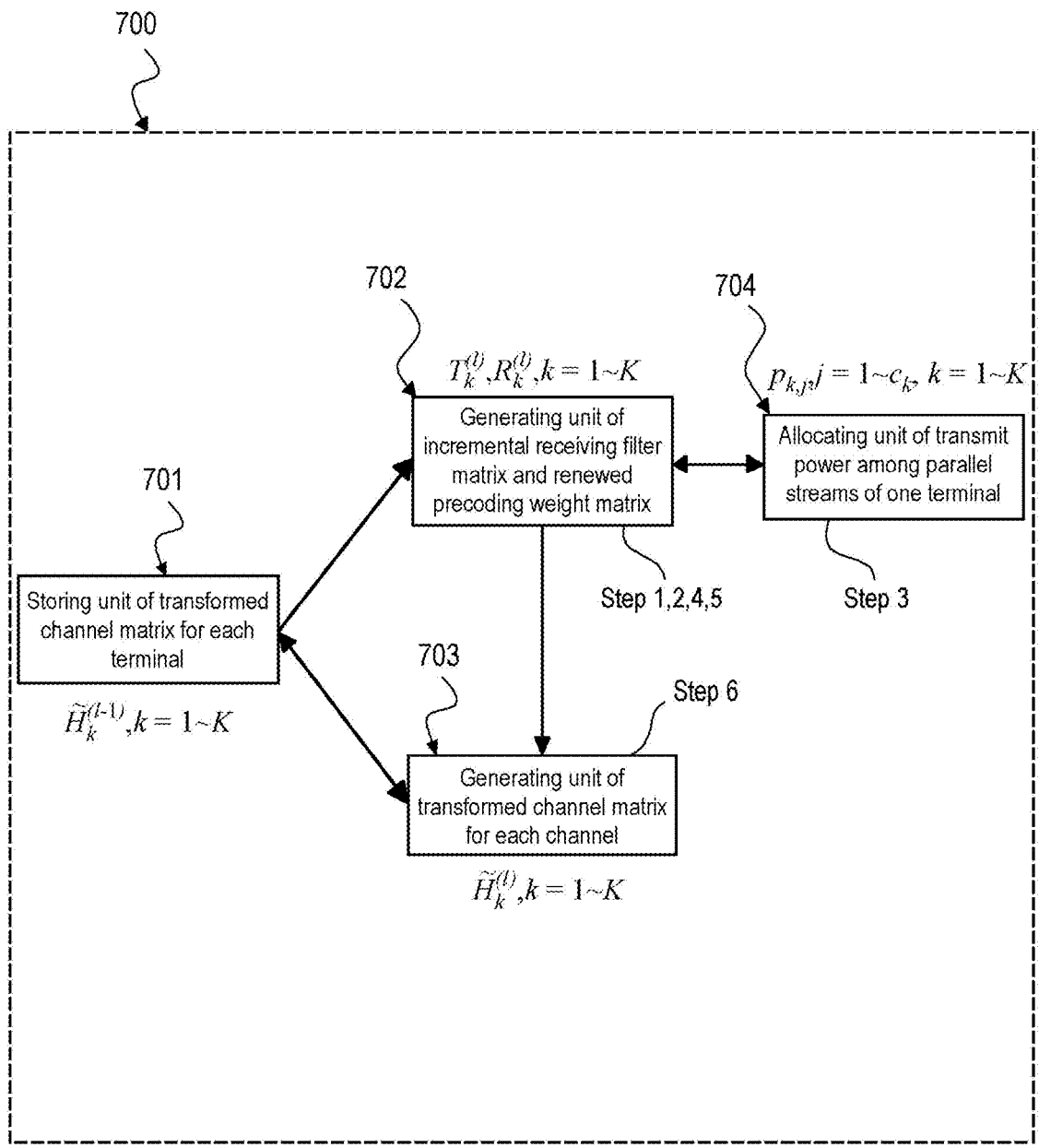
FIG. 7 is a block diagram 700 of exemplary device units implementing the iterative solution according to FIG. 4.

FIG. 7 is a block diagram 700 of exemplary device units implementing the iterative solution according to FIG. 4. For example, the subspace inheritance based solution according to the disclosure may be implemented in a processor 230 of a radio transceiver 130 as described above with respect to FIG. 2. The processor 230 may include the four processing blocks 701, 702, 703, 704 as depicted in FIG. 7. A first processing block 701 may implement a storing unit of transformed channel matrix for each terminal. A second processing block 702 may implement a generating unit of incremental receiving filter matrix and renewed precoding weight matrix. A third processing block 703 may implement a generating unit of transformed channel matrix for each terminal. A fourth processing block 704 may implement an allocating unit of transmit power among parallel streams of one terminal. These four processing blocks 701, 702, 703, 704 may interact in order to perform the subspace inheritance based solution according to the disclosure. For example, second processing unit 702 may implement steps 1, 2, 4 and 5 as described above, third processing unit 703 may implement step 6 as described above, and fourth processing unit 704 may implement step 3 as described above.

In the following a detailed description of the subspace inheritance based solution according to the disclosure is provided.

Consider a MU-MIMO system with 1 BS and N terminals. The BS is equipped with M transmitted antennas. The terminal k has $N_k$ receive antennas, and its downlink channel response matrix (called as natural channel matrix) is represented by a matrix $H_k$ with size $N_k \times M$, k=1~K. Denote $N_{total} \triangleq \Sigma_{k=1}^{K} N_k$. The maximum number of parallel spatial streams in the system is $\min(N_{total}, M)$. Without loss of generality, it is assumed in the following description that $N_{total} \leq M$, so the maximum number of streams for each terminal is equal to the number of its receive antennas. Then, the target of optimizing the precoding weight is to maximize the sum capacity of all terminals while subjected to a certain practical requirement on terminal fairness and a given maximum total transmit power.

In this disclosure, the optimization strategy is adopted that maximizes the sum capacity of multiple streams per terminal while forcing its interference to other terminals to zero, which is called the "Zero Forcing (ZF)" criterion. If the channel matrix is available at the transmitter, this criterion can be achieving by adopting the proper precoding weights of all terminals. It is noted that the rank of the precoding weight matrix for one terminal is equal to the number of its parallel streams. To keep the fairness, the total transmit power is allocated evenly to each terminal, and such allocated transmit power is further allocated in an optimized way among the streams of that terminal. In fact, other transmit power allocation will not change the process of the disclosed solution.

In the initialization stage (regarded as iteration 0), the incremental receiving filter matrix for each terminal is initialized with e.g. unit matrix, $R_k^{(0)}=I$, and then the transformed channel matrix of terminal k, denoted as $\tilde{H}_k^{(0)}$ is equal to the natural channel matrix $H_k$ with size $N_k \times M$, $\tilde{H}_k^{(0)}=H_k$, k=1~K.

For iteration l=1,2, . . . , until stopping criterion is satisfied, the transformed channel matrix $\tilde{H}_k^l$, and the precoding weight matrix, denoted as $T_k^{(l)}$, k=1~K, are updated based on the transformed channel matrix generated in last iteration $\tilde{H}_k^{(l-1)}$. The operation for terminal k is as follows:

Step 1, combine the transformed channel response matrixes of all other terminals in last iteration to form the composite co-channel matrix $\overline{H}_k^{(l-1)} \triangleq [\tilde{H}_1^{(l-1)}; \ldots; \tilde{H}_{k-1}^{(l-1)}; \tilde{H}_{k+1}^{(l-1)}; \ldots; \tilde{H}_{K-1}^{(l-1)}]$ with size $(N_{total}-N_k) \times M$. Two ways could be adopted to calculate the null subspace dimensions of $\overline{H}_k^{(l-1)}$ The first way is to make Singular Value Decomposition (SVD) to such composite co-channel matrix, $$[\overline{U}_k, \Gamma_k, \overline{V}_k] = \text{svd}(\overline{H}_k^{(l-1)}), \quad (1)$$

where the diagonal matrix $\Gamma_k$ is composed of the singular values the total number of which is assumed to $d_k$. Apply the non-dominant right singular vector, i.e. the last $M-d_k$ columns of $\overline{V}_k$ as the null subspace dimensions of the composite co-channel matrix $\overline{H}_k$, denoted as $\Theta_k^{(l-1)} \triangleq \overline{V}_k(:,M-d_k+1\sim M)$. The second way is to generate the orthogonal projection matrix of $\Theta_k^{(l-1)}$, $$\Theta_k^{(l-1)} = I - (\overline{H}_k^{(l-1)})^H (\overline{H}_k^{(l-1)}(\overline{H}_k^{(l-1)})^H)^{-1} \overline{H}_k^{(l-1)}. \quad (2)$$

Step 2, project the transformed channel response matrix of the concerned terminal onto the calculated null subspace dimensions of all other terminals, generating the post-projection transformed channel matrix, $$\check{H}_k^{(l-1)} = \tilde{H}_k^{(l-1)} \cdot \Theta_k^{(l-1)}. \quad (3)$$

Make SVD to such post-projection transformed channel response matrix, $$[\check{U}_k, \check{\Gamma}_k, \check{V}_k] = \text{svd}(\check{H}_k^{(l-1)}), \quad (4)$$

where the diagonal matrix $\check{\Gamma}_k$ is composed of the singular values the total number of which is assumed to $c_k$ where $c_k \leq N_k$. Apply its dominant left singular vector, i.e. the first $c_k$ columns of $\check{U}_k$ as the incremental receiving filter matrix introduced by this iteration, denoted as $R_k^{(l)} = \check{U}_k^H(1:c_k,:)$.

Step 3, allocate the transmit power onto the $c_k$ parallel streams which correspond to the signal subspace directions of the calculated post-projection transformed channel matrix $\check{H}_k^{(l-1)}$ denoted as $p_{k,j}$, j=1~$c_k$. In one instance, to maximize sum capacity of all the streams for this terminal, the waterfilling strategy is applied with the singular values in $\check{\Gamma}_k$ as the equivalent channel gain. Denote the number of streams whose allocated transmit power $p_{k,j}$ are zero as $e_k$, and denote $b_k^{(l)} \triangleq c_k - e_k$. Obviously, $b_k^{(0)} = N_k$.

Step 4, remove the $e_k$ rows in $R_k^{(l)}$ which corresponds to the streams whose allocated transmit power $p_{k,j}$ are zero, resulting in $b_k^{(l)}$ valid streams and $R_k^{(l)}$ with size $b_k^{(l)} \times b_k^{(l-1)}$.

Step 5, remove the $e_k$ columns in $\check{V}_k(1:c_k,:)$ which corresponds to the streams whose allocated transmit power $p_{k,j}$ are zero, denoted as $\Phi_k^{(l-1)}$. Then update the precoding weight of the concerned terminal by right multiplexing onto $\Lambda_k^{(l-1)}$, $$T_k^{(l)} = \Theta_k^{(l-1)} \cdot \Phi_k^{(l-1)}, \quad (5)$$

whose size is $M \times (c_k - \Delta_k)$.

Step 6, update the transformed channel matrix of the concerned terminal by left-multiplying the new incremental receiving filter matrix $R_k^{(l)}$ onto the transformed channel matrix that is generated in last iteration $\tilde{H}_k^{(l-1)}$, $$\tilde{H}_k^{(l)} = R_k^{(l)} \cdot \tilde{H}_k^{(l-1)}. \quad (6)$$

whose size is $b_k^{(l)} \times M$.

In difference, the prior art solution uses the post-projection natural channel matrix (but not the transformed channel matrix in last iteration) to generate post-projection channel matrix, i.e. equation (3) is replaced by $$\check{H}_k^{(l-1)} = H_k \cdot \Theta_k^{(l-1)}. \quad (7)$$

Therefore, the transformed channel matrix is only relevant to the natural channel matrix (but not the transformed channel matrix in last iteration), i.e. equation (6) is replaced by $$\tilde{H}_k^{(l)} = R_k^{(l)} \cdot H_k, \quad (8)$$

which would cause serious issues in iteration convergence, which would be illustrated in the following chapter.

A proof of iteration convergence for the subspace inheritance based solution according to the disclosure is given in the following section.

In the subspace inheritance based solution according to the disclosure, updating the post-projection transformed channel response matrix of the concerned terminal in one iteration $\check{H}_k^{(l-1)}$ is on top of its previous transformed channel response matrix in last iteration $\tilde{H}_k^{(l-1)}$ and thus the new transformed channel response matrix of the current iteration $\tilde{H}_k^{(l)}$ contains its receiving filter matrixes of all previous iterations, i.e.

$$\tilde{H}_k^{(l)} = R_k^{(l)} \cdot \tilde{H}_k^{(l-1)} = R_k^{(l)} \cdot R_k^{(l-1)} \cdot \tilde{H}_k^{(l-2)} = \ldots = R_k^{(l)} \cdot R_k^{(l-1)} \ldots R_k^{(1)} \cdot H_k. \quad (9)$$

This way restricts the new transformed channel response matrix $\tilde{H}_k^{(l)}$ of one terminal lies in its post-projection signal subspace inherited from last iteration span($R_k^{(l-1)}$), and thus remains the orthogonality with the generated other terminals' precoding weight of last iteration. Denote the subspace spanned by the row vectors of a matrix as span(•), then for all the historical iterations $$\text{span}(\tilde{H}_k^{(l)}) \subseteq \text{span}(\tilde{H}_k^{(l-1)}) \subseteq \ldots \subseteq \text{span}(\tilde{H}_k^{(1)}) \subseteq \text{span}(H_k). \quad (10)$$

So the orthogonality between $T_k^{(l)}$ and $\tilde{H}_{k'}^{(l-1)}$ can recursively lead to the orthogonality between $T_k^{(l)}$ and $\tilde{H}_{k'}^{(l)}$. When all terminals follow such restriction, the mutual orthogonality between any pair of terminals that are setup in the first iteration and maintained in all previous iterations would continue in the current iteration. This mechanism can avoid the iteration fluctuation and guarantee the absolute convergence.

Regarding the stopping criterion, since the transformed channel matrix is restricted into the signal subspace of last iteration, if the parallel streams of one terminal is unchanged, the signal subspace formed by the new transformed channel matrix is also unchanged from that of last iteration, so its impact on the generation of other terminals' precoding weight is held on. When all terminals enter such state, the update of transformed channel matrix and precoding weight matrix is terminated.

As in equation (7), the ZF based solution (without subspace inheritance) as described above with respect to FIG. 2 updates the post-projection transformed channel matrix in one iteration $\breve{H}_k^{(l-1)}$ is on top of the natural channel response matrix $H_k$. Thus, the new transformed channel matrix of the current iteration $\tilde{H}_k^{(l)}$ is irrelevant to its receiving filter matrixes of any previous iteration $R_k^{(l')}$, $l' < l$.

In this way, there is no restriction between the new updated transformed channel response matrix of one terminal $\tilde{H}_k^{(l)}$ and its signal subspace of last iteration $R_k^{(l-1)}$. So span($\tilde{H}_k^{(l)}$) in current iteration may go beyond span($\tilde{H}_k^{(l-1)}$) in last iteration. So the orthogonality between $T_k^{(l)}$ and $\tilde{H}_{k'}^{(l-1)}$ cannot be maintained between $T_k^{(l)}$ and $\tilde{H}_{k'}^{(l)}$, $k' \neq k$.

If updating the precoding weight and the transformed channel matrix of all terminals are performed in a parallel approach in one iteration, each terminal succeeds in making its precoding weight $T_k^{(l)}$ orthogonal to other terminals' transformed channel matrix of last iteration $\tilde{H}_{k'}^{(l-1)}$, but fails in keeping such orthogonality to others' transformed channel matrix of current iteration $\tilde{H}_{k'}^{(l)}$, $k' \neq k$.

If updating precoding weight and transformed channel matrix of all terminals are performed in a successive approach in one iteration, each terminal succeeds in making its precoding weight $T_k^{(l)}$ orthogonal to the previous-processed terminals' transformed channel matrix of current iteration $\tilde{H}_{k'}^{(l)}$, $k' < k$, but fails in keeping such orthogonality to the following-processed terminals' transformed channel matrix of current iteration $\tilde{H}_{k'}^{(l)}$, $k' > k$.

This issue would cause iteration fluctuation and fails in convergence to a steady and high-performance result.

Figure 8A:
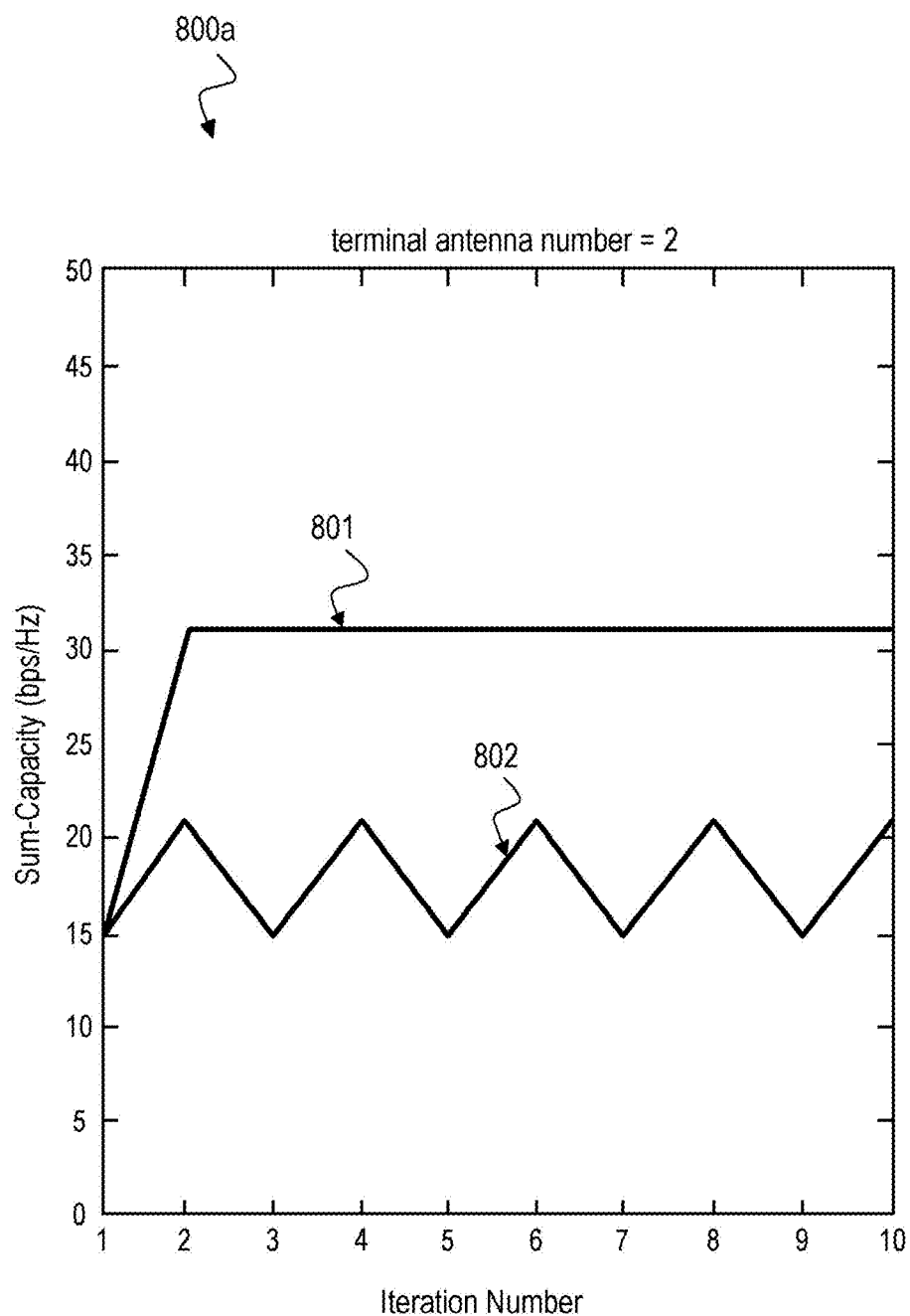
FIGS. 8a, 8b and 8c are performance diagrams illustrating the sum capacitance over iteration for the disclosed solution in comparison with other solutions.
Figure 8B:
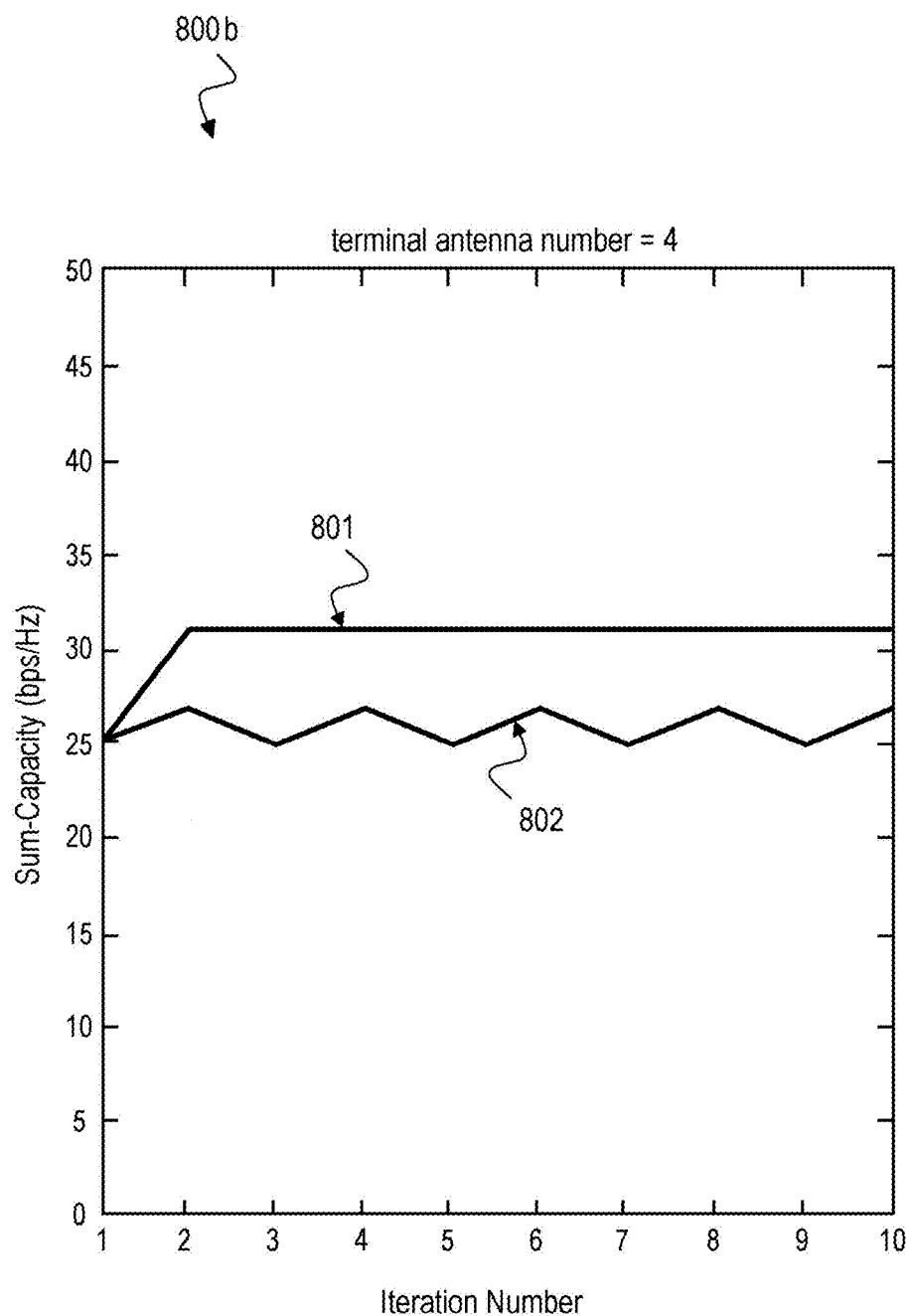
Figure 8C:
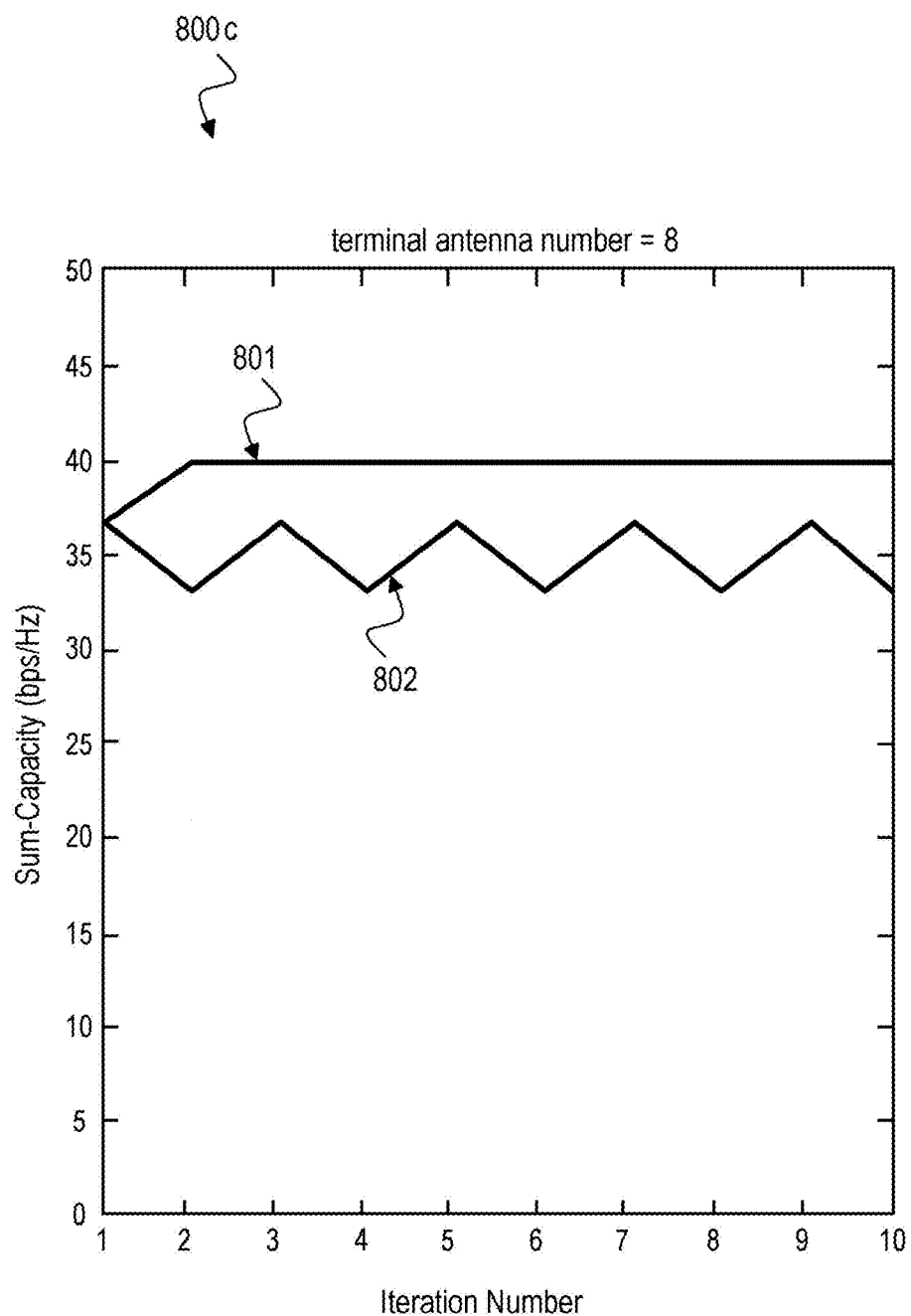

FIGS. 8a, 8b and 8c are performance diagrams illustrating the sum capacitance over iteration for the disclosed subspace inheritance based solution in comparison with other solutions which are not based on subspace inheritance.

To evaluate the benefit of this disclosed subspace inheritance based solution 801 over non-subspace inheritance based solutions 802, the simulation is made for the independent identical distributed (i.i.d.) MIMO channel, where each entry of the channel matrix satisfies complex-Gaussian distributions.

As shown in FIGS. 8a, 8b and 8c where BS antenna number is 16 and terminal antenna number is 2, 4, 8 respectively, though both are based on per-user ZF criterion, the per-user zero-forcing (ZF) solution 802 (without subspace inheritance) fails to converge to a good result, while the disclosed inheritance based solution 801 can quickly reach the convergence through two iterations, and the final performance of sum capacity is better. These two solutions have identical complexity.

Figure 9A:
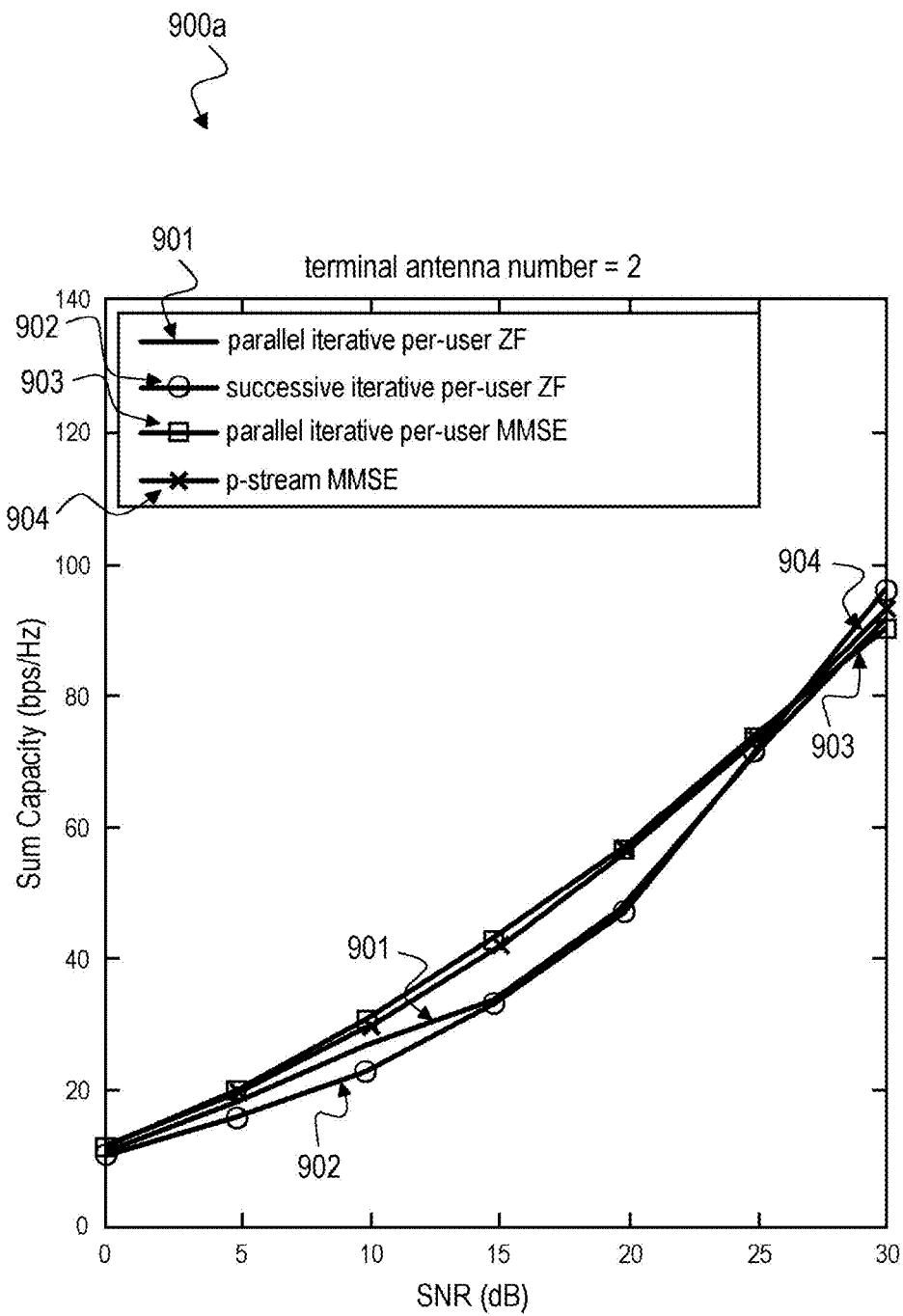
FIGS. 9a, 9b and 9c are performance diagrams illustrating the sum capacitance over SNR for the disclosed solution in comparison with other solutions.
Figure 9B:
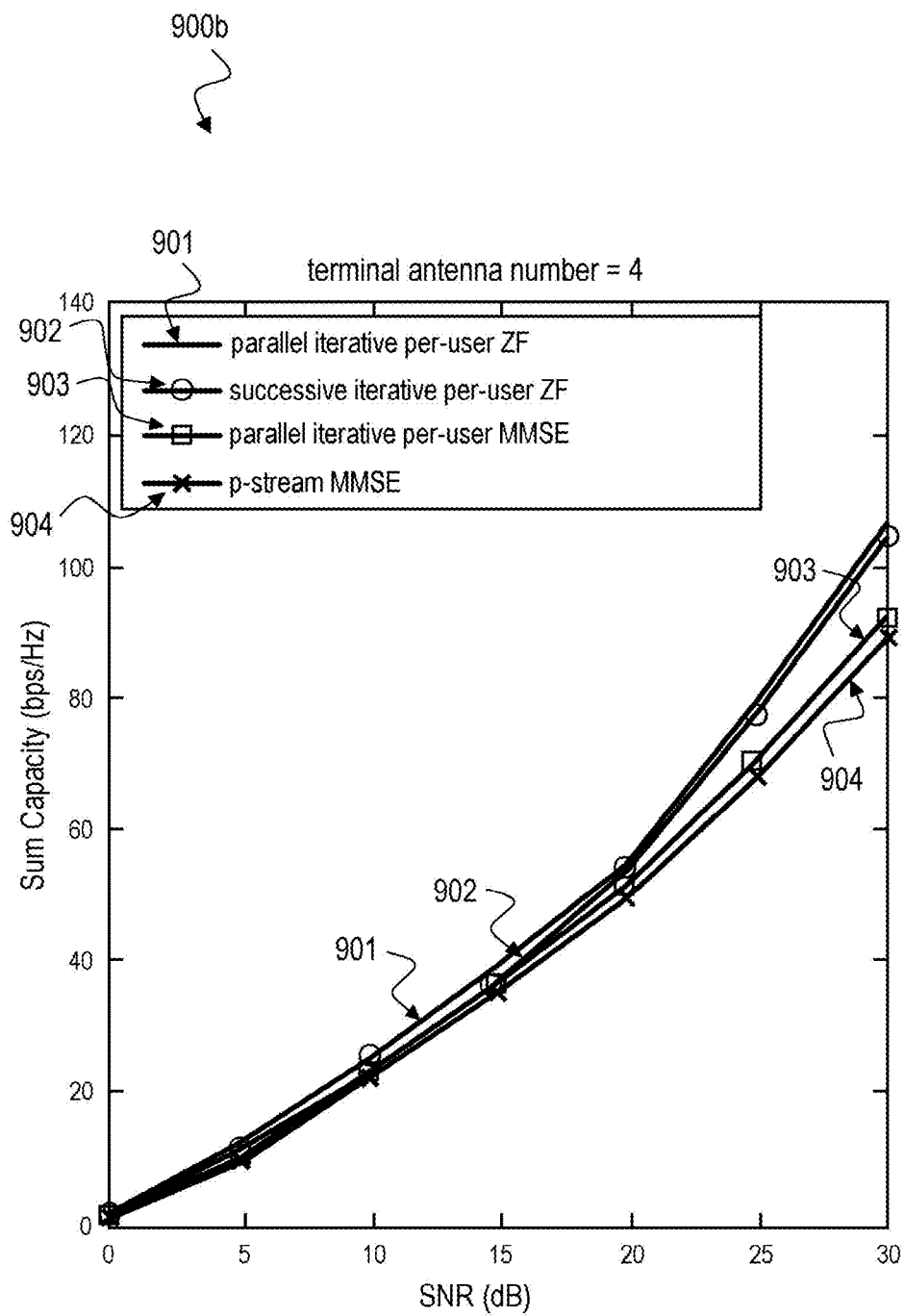
Figure 9C:
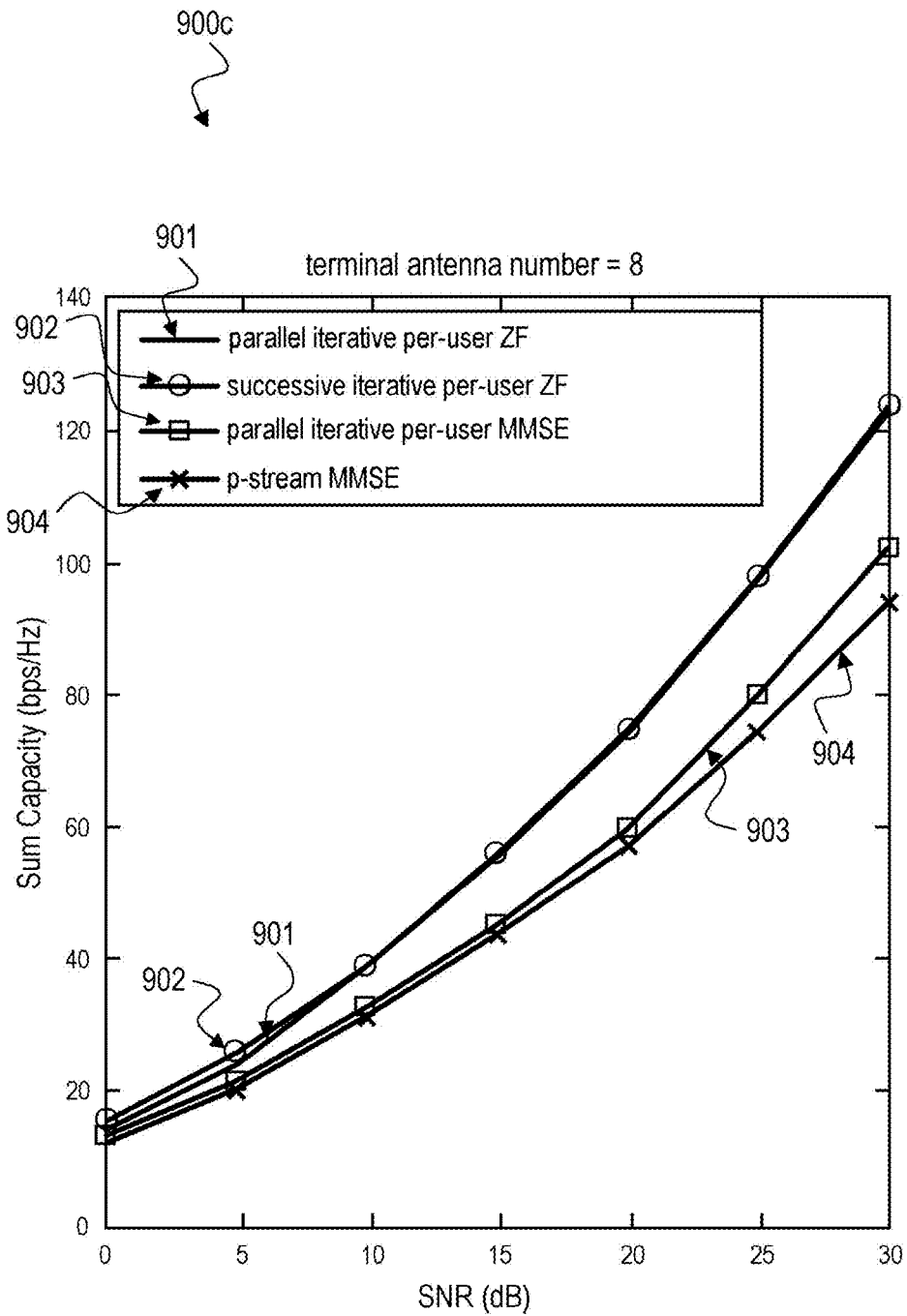

FIGS. 9a, 9b and 9c are performance diagrams illustrating the sum capacitance over SNR for the disclosed subspace inheritance based solution 901, 902 in comparison with other solutions 903, 904 that are not based on subspace inheritance. The first graph 901 depicts the disclosed subspace inheritance based solution 901 when using parallel iterations as described above with respect to FIG. 5a. The second graph 902 depicts the disclosed subspace inheritance based solution 902 when using successive iterations as described above with respect to FIG. 5b. The third graph 903 depicts the parallel iterations per-user MMSE solution and the fourth graph 904 depicts the per-stream MMSE solution.

As shown in FIGS. 9a, 9b and 9c, where BS antenna number is 16 and terminal antenna number is 2, 4, 8 respectively, the disclosed subspace inheritance based solution 901, 902 has similar performance no matter if it adopts parallel 901 or successive 902 sequence. When compared with per-stream MMSE solution 904 and per-user MMSE solution 903, i.e. solutions as described above with respect to FIG. 2, that are not based on subspace inheritance, its relative gain is expanded with the increase of terminal antenna number. When observing the performance of SNR=30 dB since the MU-MIMO is normal applied in cell-center area, the performance comparison results are as follows:

The disclosed subspace inheritance based solution 901, 902 has similar performance as the per-user and per-stream MMSE solution 903, 904 when terminal antenna number is 2. The disclosed subspace inheritance based solution 901, 902 has 17% performance gain over the per-user and per-stream MMSE solutions 903, 904 when terminal antenna number is 4. The disclosed subspace inheritance based solution 901, 902 has 33% performance gain over the per-user and per-stream MMSE solutions 903, 904 when terminal antenna number is 8.

This disclosure presents a new per-user ZF solution based on subspace inheritance which provides improved performance and acceptable complexity. It can be used in the key 5G feature, that is, massive MIMO systems.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 300 or the techniques described above with respect to FIGS. 2 and 4 to 7. Such a computer program product may include a computer-readable non-transitory storage medium storing program code thereon for use by a processor, the program code comprising instructions for performing any of the method 300 or the techniques as described above.

EXAMPLES

The following examples pertain to further embodiments. Example 1 is a radio transceiver, comprising: a precoder configured to precode a data signal for transmission to a plurality of multi-stream terminals based on a plurality of precoding weight matrices; and a processor configured to generate for each terminal in an iterative manner a precoding weight matrix and a transformed channel matrix, wherein the transformed channel matrix indicates a channel gain between the radio transceiver and the respective terminal transformed by a receive filter matrix of the respective terminal, wherein the generation of the precoding weight matrix and the transformed channel matrix in a current iteration is based on the transformed channel matrix generated from a previous iteration.

In Example 2, the subject matter of Example 1 can optionally include that the processor is configured to generate the transformed channel matrix based on subspace inheritance between two successive iterations.

In Example 3, the subject matter of any one of Examples 1-2 can optionally include that the processor is configured to determine the transformed channel matrix of a respective terminal in the current iteration based on the receive filter matrices of the respective terminal from all previous iterations.

In Example 4, the subject matter of any one of Examples 1-3 can optionally include that the processor is configured to restrict a signal subspace of the transformed channel matrix in the current iteration within the signal subspace of the transformed channel matrix from the previous iterations.

In Example 5, the subject matter of any one of Examples 1-4 can optionally include that the processor is configured to generate the precoding weight matrix and the transformed channel matrix for a number of iterations until a stopping criterion is fulfilled.

In Example 6, the subject matter of Example 5 can optionally include that the stopping criterion is fulfilled if the number of parallel streams for each terminal is convergent.

In Example 7, the subject matter of any one of Examples 5-6 can optionally include that the stopping criterion is fulfilled after a number of two or three iterations.

In Example 8, the subject matter of any one of Examples 1-7 can optionally include a receiver configured to receive feedback from the plurality of terminals, wherein the feedback comprises information about the channel gains.

In Example 9, the subject matter of any one of Examples 1-8 can optionally include that the processor is configured to initialize the receive filter matrix of the respective terminal in a first iteration to a predetermined matrix.

In Example 10, the subject matter of any one of Examples 1-9 can optionally include that the processor is configured to generate the transformed channel matrix in the first iteration based on a natural channel matrix, wherein the entries of the natural channel matrix comprise raw channel gains between the radio transceiver and the respective terminal without any transmitting signal processing or receiving signal processing.

In Example 11, the subject matter of any one of Examples 1-10 can optionally include that the processor is configured to generate a composite co-channel matrix for a specific terminal in the current iteration based on combining the transformed channel matrices of all other terminals from the previous iteration.

In Example 12, the subject matter of Example 11 can optionally include that the processor is configured to determine null subspace dimensions of the composite co-channel matrix.

In Example 13, the subject matter of Example 12 can optionally include that the processor is configured to project the transformed channel matrix of the specific terminal onto the null subspace dimensions of the composite co-channel matrix to generate a post-projection transformed channel matrix.

In Example 14, the subject matter of Example 13 can optionally include that the processor is configured to generate singular values and singular vectors of the post-projection transformed channel matrix.

In Example 15, the subject matter of Example 14 can optionally include that the processor is configured to generate the receive filter matrix of the specific terminal based on dominant singular values and singular vectors of the post-projection transformed channel matrix.

In Example 16, the subject matter of Example 15 can optionally include that the processor is configured to allocate a transmit power for the specific terminal onto a number of parallel streams which correspond to signal subspace directions which is spanned by the singular vectors of the post-projection transformed channel matrix.

In Example 17, the subject matter of Example 16 can optionally include that the processor is configured to remove rows in the receive filter matrix of the specific terminal which correspond to the streams whose allocated transmit powers are zero.

In Example 18, the subject matter of Example 17 can optionally include that the processor is configured to update the precoding weight matrix in the current iteration based on the null subspace dimensions of the composite co-channel matrix from the previous iteration.

In Example 19, the subject matter of any one of Examples 17-18 can optionally include that the processor is configured to update the transformed channel matrix in the current iteration based on a combination of the receive filter matrix in the current iteration with the transformed channel matrix from the previous iteration.

Example 20 is a radio transceiver circuit, comprising: a precoder configured to precode a data signal for beamforming to a plurality of terminals, wherein the precoding is based on a plurality of precoding weights; and a processor configured to generate for each terminal of the plurality of terminals a precoding weight and a channel gain between the radio transceiver and a respective terminal, wherein the channel gain is transformed by a receive filter of the respective terminal, wherein the generation of the precoding weight and the transformed channel gain is based on a transformed channel gain generated from a previous processing.

In Example 21, the subject matter of Example 20 can optionally include that the processor is configured to iteratively process the generation of the precoding weights and the transformed channel gains.

In Example 22, the subject matter of Example 21 can optionally include that the processor is configured to determine the transformed channel gain of a respective terminal in a current iteration based on the receive filters of the respective terminal from all previous iterations.

In Example 23, the subject matter of any one of Examples 21-22 can optionally include that the processor is configured to restrict a signal subspace of the transformed channel gain in a current iteration within the signal subspace of the transformed channel gain from a previous iterations.

In Example 24, the subject matter of any one of Examples 21-23 can optionally include that the processor is configured to generate the precoding weight and the transformed channel gain for a number of iterations until a stopping criterion is fulfilled.

In Example 25, the subject matter of any one of Examples 21-24 can optionally include that the processor is configured to initialize the receive filter of the respective terminal in a first iteration to a predetermined value.

In Example 26, the subject matter of Example 25 can optionally include that the processor is configured to set the transformed channel gain in the first iteration to the channel gain between the radio transceiver and the respective terminal.

In Example 27, the subject matter of any one of Examples 20-26 can optionally include a receiver configured to receive feedback from the plurality of terminals, wherein the feedback comprises information about the channel gains.

Example 28 is a method for processing a data signal for transmission to a plurality of multi-stream terminals, the method comprising: precoding a data signal for transmission to a plurality of multi-stream terminals based on a plurality of precoding weight matrices; and generating for each terminal in an iterative manner a precoding weight matrix and a transformed channel matrix, wherein the transformed channel matrix indicates a channel gain between a base station and the respective terminal transformed by a receive filter matrix of the respective terminal, wherein the generation of the precoding weight matrix and the transformed channel matrix in a current iteration is based on the transformed channel matrix generated from a previous iteration.

In Example 29, the subject matter of Example 28 can optionally include: generating the transformed channel matrix based on subspace inheritance between two successive iterations.

In Example 30, the subject matter of any one of Examples 28-29 can optionally include: determining the transformed channel matrix of a respective terminal in the current iteration based on the receive filter matrices of the respective terminal from all previous iterations.

In Example 31, the subject matter of any one of Examples 28-29 can optionally include: restricting a signal subspace of the transformed channel matrix in the current iteration within the signal subspace of the transformed channel matrix from the previous iterations.

In Example 32, the subject matter of any one of Examples 28-31 can optionally include: generating the precoding weight matrix and the transformed channel matrix for a number of iterations until a stopping criterion is fulfilled.

In Example 33, the subject matter of Example 32 can optionally include that the stopping criterion is fulfilled if the number of parallel streams for each terminal is convergent.

In Example 34, the subject matter of any one of Examples 32-33 can optionally include that the stopping criterion is fulfilled after a number of two or three iterations.

In Example 35, the subject matter of any one of Examples 28-34 can optionally include: receiving feedback from the plurality of terminals, wherein the feedback comprises information about the channel gains and the respective receive filter matrices.

In Example 36, the subject matter of any one of Examples 28-35 can optionally include: initializing the receive filter matrix of the respective terminal in a first iteration to a predetermined matrix.

In Example 37, the subject matter of any one of Examples 28-36 can optionally include: generating the transformed channel matrix in the first iteration based on a natural channel matrix, wherein the entries of the natural channel matrix comprise raw channel gains between the base station and the respective terminal without any transmitting signal processing or receiving signal processing.

In Example 38, the subject matter of any one of Examples 28-37 can optionally include: generating a composite co-channel matrix for a specific terminal in the current iteration based on combining the transformed channel matrices of all other terminals from the previous iteration.

In Example 39, the subject matter of Example 38 can optionally include: determining null subspace dimensions of the composite co-channel matrix.

In Example 40, the subject matter of Example 39 can optionally include: projecting the transformed channel matrix of the specific terminal onto the null subspace dimensions of the composite co-channel matrix to generate a post-projection transformed channel matrix.

In Example 41, the subject matter of Example 40 can optionally include: generating singular values and singular vectors of the post-projection transformed channel matrix.

In Example 42, the subject matter of Example 41 can optionally include: generating the receive filter matrix of the specific terminal based on dominant singular values and singular vectors of the post-projection transformed channel matrix.

In Example 43, the subject matter of Example 42 can optionally include: allocating a transmit power for the specific terminal onto a number of parallel streams which correspond to signal subspace directions which is spanned by the singular vectors of the post-projection transformed channel matrix.

In Example 44, the subject matter of Example 43 can optionally include: removing rows in the receive filter matrix of the specific terminal which correspond to the streams whose allocated transmit powers are zero.

In Example 45, the subject matter of Example 44 can optionally include: updating the precoding weight matrix in the current iteration based on the null subspace dimensions of the composite co-channel matrix from the previous iteration.

In Example 46, the subject matter of any one of Examples 44-45 can optionally include: updating the transformed channel matrix in the current iteration based on a combination of the receive filter matrix in the current iteration with the transformed channel matrix from the previous iteration.

Example 47 is a communication system, comprising: a plurality of multi-stream terminals; and a base station, comprising: a precoder configured to precode a data signal for transmission to the plurality of multi-stream terminals based on a plurality of precoding weight matrices; and a processor configured to generate for each terminal in an iterative manner a precoding weight matrix and a transformed channel matrix, wherein the transformed channel matrix indicates a channel gain between the base station and the respective terminal transformed by a receive filter matrix of the respective terminal, wherein the generation of the precoding weight matrix and the transformed channel matrix in a current iteration is based on the transformed channel matrix generated from a previous iteration.

In Example 48, the subject matter of Example 47 can optionally include that the plurality of terminals are configured to transmit feedback information to the BS, the feedback information comprising information about the channel gains.

Example 49 is a device, comprising: means for precoding a data signal for transmission to a plurality of multi-stream terminals based on a plurality of precoding weight matrices; and means for generating for each terminal in an iterative manner a precoding weight matrix and a transformed channel matrix, wherein the transformed channel matrix indicates a channel gain between a base station and the respective terminal transformed by a receive filter matrix of the respective terminal, wherein the generation of the precoding weight matrix and the transformed channel matrix in a current iteration is based on the transformed channel matrix generated from a previous iteration.

In Example 50, the subject matter of Example 49 can optionally include means for generating the transformed channel matrix based on subspace inheritance between two successive iterations.

Example 51 is a computer readable non-transitory medium on which computer instructions are stored which when executed by a computer cause the computer to perform the method of any one of Examples 28 to 46.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A radio transceiver, comprising:
a precoder configured to precode a data signal for transmission to a plurality of multi-stream terminals based on a plurality of precoding weight matrices; and
a processor configured to generate for each terminal in an iterative manner a precoding weight matrix and a transformed channel matrix, wherein the transformed channel matrix indicates a channel gain between the radio transceiver and the respective terminal transformed by a receive filter matrix of the respective terminal, wherein the processor is configured to generate the transformed channel matrix based on subspace inheritance between two successive iterations,
wherein the generation of the precoding weight matrix and the transformed channel matrix in a current iteration is based on the transformed channel matrix generated from a previous iteration.

2. The radio transceiver of claim 1,
wherein the processor is configured to determine the transformed channel matrix of a respective terminal in the current iteration based on the receive filter matrices of the respective terminal from all previous iterations.

3. The radio transceiver of claim 1,
wherein the processor is configured to restrict a signal subspace of the transformed channel matrix in the current iteration within the signal subspace of the transformed channel matrix from the previous iterations.

4. The radio transceiver of claim 1,
wherein the processor is configured to generate the precoding weight matrix and the transformed channel matrix for a number of iterations until a stopping criterion is fulfilled.

5. The radio transceiver of claim 4,
wherein the stopping criterion is fulfilled if a number of parallel streams for each terminal is convergent.

6. The radio transceiver of claim 4,
wherein the stopping criterion is fulfilled after a number of two or three iterations.

7. The radio transceiver of claim 1, comprising:
a receiver configured to receive feedback from the plurality of terminals, wherein the feedback comprises information about the channel gains.

8. The radio transceiver of claim 1,
wherein the processor is configured to initialize the receive filter matrix of the respective terminal in a first iteration to a predetermined matrix.

9. The radio transceiver of claim 1,
wherein the processor is configured to generate the transformed channel matrix in a first iteration based on a natural channel matrix, wherein entries of the natural channel matrix comprise raw channel gains between the radio transceiver and the respective terminal without any transmitting signal processing or receiving signal processing.

10. The radio transceiver of claim 1,
wherein the processor is configured to generate a composite co-channel matrix for a specific terminal in the current iteration based on combining the transformed channel matrices of all other terminals from the previous iteration.

11. The radio transceiver of claim 10,
wherein the processor is configured to determine null subspace dimensions of the composite co-channel matrix.

12. The radio transceiver of claim 11,
wherein the processor is configured to project the transformed channel matrix of the specific terminal onto the null subspace dimensions of the composite co-channel matrix to generate a post-projection transformed channel matrix.

13. The radio transceiver of claim 12,
wherein the processor is configured to generate singular values and singular vectors of the post-projection transformed channel matrix.

14. The radio transceiver of claim 13,
wherein the processor is configured to generate the receive filter matrix of the specific terminal based on dominant singular values and singular vectors of the post-projection transformed channel matrix.

15. The radio transceiver of claim 14,
wherein the processor is configured to allocate a transmit power for the specific terminal onto a number of parallel streams which correspond to signal subspace directions of the post-projection transformed channel matrix.

16. The radio transceiver of claim 15,
wherein the processor is configured to remove rows in the receive filter matrix of the specific terminal which correspond to the streams whose allocated transmit powers are zero.

17. The radio transceiver of claim 16,
wherein the processor is configured to update the precoding weight matrix in the current iteration based on the null subspace dimensions of the composite co-channel matrix from the previous iteration.

18. The radio transceiver of claim 16,
wherein the processor is configured to update the transformed channel matrix in the current iteration based on a combination of the receive filter matrix in the current iteration with the transformed channel matrix from the previous iteration.

19. A radio transceiver circuit, comprising:
a precoder configured to precode a data signal for beamforming to a plurality of terminals, wherein the precoding is based on a plurality of precoding weights; and
a processor configured to generate for each terminal of the plurality of terminals a precoding weight of the plurality of precoding weights and a channel gain between the radio transceiver and a respective terminal, wherein the channel gain is transformed by a receive filter of the respective terminal, wherein the processor is configured to
iteratively process the generation of the precoding weights and transformed channel gains, and wherein the processor is configured to determine the transformed channel gain of a respective terminal in a current iteration based on the receive filters of the respective terminal from all previous iterations,
wherein the generation of the precoding weight and the transformed channel gain is based on a transformed channel gain generated from a previous processing.

20. A method for processing a data signal for transmission to a plurality of multi-stream terminals, the method comprising:
precoding a data signal for transmission to a plurality of multi-stream terminals based on a plurality of precoding weight matrices; and
generating for each terminal in an iterative manner a precoding weight matrix and a transformed channel matrix, wherein the transformed channel matrix indicates a channel gain between a base station and the respective terminal transformed by a receive filter matrix of the respective terminal, wherein the transformed channel matrix is generated based on subspace inheritance between two successive iterations,
wherein the generation of the precoding weight matrix and the transformed channel matrix in a current iteration is based on the transformed channel matrix generated from a previous iteration.

21. The method of claim 20, comprising:
determining the transformed channel matrix of a respective terminal in the current iteration based on the receive filter matrices of the respective terminal from all previous iterations.

* * * * *